United States Patent
Saruwatari et al.

(10) Patent No.: US 8,988,836 B2
(45) Date of Patent: Mar. 24, 2015

(54) POWER CIRCUIT, AND COMPUTER-READABLE RECORDING MEDIUM STORING A CONTROL PROGRAM FOR POWER CIRCUITS

(75) Inventors: Hirotaka Saruwatari, Sakai (JP); Yuuko Nakashita, Sakai (JP); Nobuyasu Hiraoka, Sakai (JP); Satoshi Yagi, Sakai (JP); Hirotaka Doi, Sakai (JP); Keisuke Shimatani, Sakai (JP)

(73) Assignee: Daikin Industries, Ltd., Osaka-Shi (JP)

( * ) Notice: Subject to any disclaimer, the term of this patent is extended or adjusted under 35 U.S.C. 154(b) by 756 days.

(21) Appl. No.: 13/264,639

(22) PCT Filed: Mar. 18, 2010

(86) PCT No.: PCT/JP2010/001955
§ 371 (c)(1),
(2), (4) Date: Oct. 14, 2011

(87) PCT Pub. No.: WO2010/119620
PCT Pub. Date: Oct. 21, 2010

(65) Prior Publication Data
US 2012/0033334 A1 Feb. 9, 2012

(30) Foreign Application Priority Data

Apr. 17, 2009 (JP) ................................. 2009-100747
Apr. 17, 2009 (JP) ................................. 2009-101325

(51) Int. Cl.
*H02H 7/00* (2006.01)
*H02H 5/04* (2006.01)
(Continued)

(52) U.S. Cl.
CPC ..................................... *H02P 27/06* (2013.01)
USPC ............... 361/22; 361/31; 318/432; 318/433; 318/434

(58) Field of Classification Search
CPC ....... H02H 7/08; H02H 7/085; H02H 7/0851; H02H 7/0833

USPC ....................... 361/22, 31; 318/432, 433, 434
See application file for complete search history.

(56) References Cited

U.S. PATENT DOCUMENTS 3,742,302 A * 6/1973 Neill ............................... 361/22
3,777,240 A * 12/1973 Neill ............................. 318/471
(Continued)

FOREIGN PATENT DOCUMENTS

CN            2669068 Y      1/2005
JP          2001-45679 A     2/2001
(Continued)

OTHER PUBLICATIONS

JP2007-282318, Publication date Oct. 25, 2007; Inventor: Takebayashi Hiroto; Assignee: Toshiba—Machine English Translation.*

*Primary Examiner* — Eduardo Colon Santana
*Assistant Examiner* — Gabriel Agared
(74) *Attorney, Agent, or Firm* — Birch, Stewart, Kolasch & Birch, LLP

(57) ABSTRACT

When an abnormality occurs in a refrigeration cycle, the inverter motor provided in the air conditioner is stopped reliably and contacts of the main relay are prevented from degradation and fusion. A power circuit 1 of the air conditioner includes a rectifier circuit RC, a capacitor C (smoothing unit), a main relay 10 provided on a current path between the rectifier circuit RC and the capacitor C, an inverter circuit 30, a microcomputer 100, and a delay circuit 40. The microcomputer 100 has an inverter circuit control unit 110, a main relay opening/closing control unit 120, a waveform forced cut-off unit 130, and a cut-off signal output unit 140. Where a high-pressure switch 200 (abnormality detection unit) detects a high-pressure abnormality and outputs a high-pressure abnormality signal to the waveform forced cut-off unit 130 when the main relay 10 is in a closed state, the waveform forced cut-off unit 130 electrically cuts off the inverter circuit control unit 110, and the cut-off signal output unit 140 outputs a cut-off signal, which sets the main relay 10 to the open state, to the main relay 10 via the delay circuit 40.

5 Claims, 7 Drawing Sheets

(51) Int. Cl.
*H02P 7/00* (2006.01)
*H02P 27/06* (2006.01)

(56) References Cited

U.S. PATENT DOCUMENTS 4,557,114 A * 12/1985 Kato et al. ............... 62/126
5,375,429 A * 12/1994 Tokizaki et al. ............ 62/235.1
8,498,136 B2 * 7/2013 Shinomoto et al. .......... 363/125
2011/0019452 A1 * 1/2011 Shinomoto et al. .......... 363/126

FOREIGN PATENT DOCUMENTS

JP 2007-282318 A 10/2007
JP 2008-14511 A 1/2008

* cited by examiner

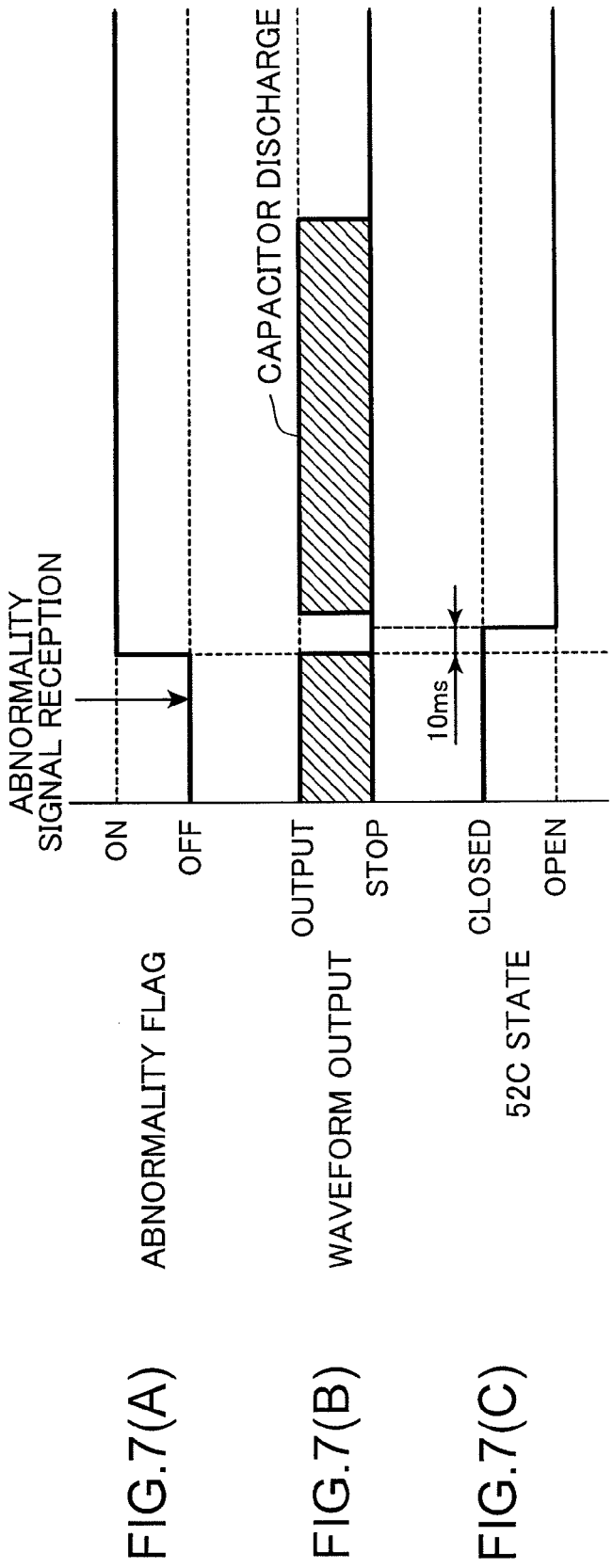

US 8,988,836 B2

POWER CIRCUIT, AND COMPUTER-READABLE RECORDING MEDIUM STORING A CONTROL PROGRAM FOR POWER CIRCUITS

TECHNICAL FIELD

The present invention relates to technology of power circuits for air conditioners provided with an inverter motor.

BACKGROUND ART

A power circuit for an air conditioner in which a refrigeration cycle is executed by circulating a refrigerant in a refrigerant circuit in which a compressor, a heat-source-side heat exchanger, an expansion valve, and a utility-side heat exchanger are connected by piping is provided with a main relay in the current path of the power circuit in order to cut off power supply to the inverter motor that is connected to the power circuit and drives the compressor or the like and stop the inverter motor. The main relay has been conventionally provided in the power circuit on an alternating current path between the external power source and the rectifier circuit that rectifies the alternating current power (see, for example, Patent Document 1 (air conditioner main switch 21)).

As shown in Patent Document 1, in the case of a power circuit in which the main relay is provided on the alternating current path, the main relay is necessary for each of the alternative current power source lines of each phase connected to the external power source. Therefore, the power circuit is increased in size and cost.

Where the main relay is provided on the direct current path between the rectifier circuit and the smoothing unit, it is not necessary to provide the main relay in the alternating current power source line of each phase and the power circuit can be reduced in size and cost. However, in this case, degradation or fusion can occur in the main relay for the below-described reasons.

Since the inverter motor is connected to the power circuit, a large current flows in the current path in the power circuit when the inverter motor is driven. Therefore, for example, when the main relay is opened to stop the operating inverter motor when an abnormality occurs in the refrigeration cycle, where the main relay is opened in the energized state thereof, a large load is applied to the contacts of the main relay and the contacts of the main relay can degrade or fuse.

In the power circuit in which the main relay is provided on the alternating current path, the main relay can be opened in a non-energized state and the contacts of the main relay can be prevented from degradation and fusion by opening the main relay in the zero cross point of the alternating current power supplied from the external power source. However, in the power circuit in which the main relay is provided on the direct current path, the main relay cannot be opened in the zero cross point and therefore the probability of degradation and fusion in the main relay increases.

Patent Document 1: Japanese Patent Application Laid-open No. 2001-45679.

SUMMARY OF THE INVENTION

The present invention has been created to resolve the abovementioned problems and it is an object thereof to provide at a low cost a power circuit that can prevent the contacts of the main relay from degrading and fusing when an abnormality occurs in a refrigeration cycle.

The power circuit according to one aspect of the present invention is a power circuit (1) for an air conditioner in which a refrigeration cycle is executed by circulating a refrigerant in a refrigerant circuit where a compressor, a heat-source-side heat exchanger, an expansion valve, and a utility-side heat exchanger are connected by piping, the power circuit comprising:

a rectifier circuit (RC) that rectifies alternating current power supplied from an external power source;

a smoothing unit (C) that smoothes output power of the rectifier circuit (RC);

a main relay (10) provided on a current path between the rectifier circuit (RC) and the smoothing unit (C);

an inverter circuit (30) connected between the smoothing unit (C) and an inverter motor (M) which is a load and generating alternating current power to be supplied to the inverter motor (M);

a microcomputer (100) having a main relay opening/closing control unit (120) that outputs an opening/closing control signal which provides opening/closing direction to the main relay (10), an inverter circuit control unit (110) outputting a drive signal to the inverter circuit (30), a waveform forced cut-off unit (130) that receives input of an abnormality signal outputted when an abnormality detection unit (200), which detects an abnormality of the air conditioner, detects the abnormality, and electrically cuts off the inverter circuit control unit (110) when the abnormality signal is inputted, and a cut-off signal output unit (140) that outputs a cut-off signal that is a control signal setting the main relay (10) to an open state to the main relay (10) when the abnormality signal is inputted to the waveform forced cut-off unit (130), and moreover the microcomputer (100) controlling opening/closing operation of the main relay (10) and operation of the inverter circuit (30); and a delay circuit (40) that receives input of the cut-off signal and outputs the cut-off signal to the main relay (10) after a predetermined time elapses since the input, wherein when the main relay (10) is in a closed state and the abnormality signal has been inputted to the waveform forced cut-off unit (130), the waveform forced cut-off unit (130) electrically cuts off the inverter circuit control unit (110), the cut-off signal outputted from the cut-off signal output unit (140) is inputted to the main relay (10) via the delay circuit (40), and the main relay (10) is set to an open state by the input of the cut-off signal.

The power circuit according to another aspect of the present invention is a power circuit (2) for an air conditioner in which a refrigeration cycle is executed by circulating a refrigerant in a refrigerant circuit where a compressor, a heat-source-side heat exchanger, an expansion valve, and a utility-side heat exchanger are connected by piping, the power circuit comprising:

a rectifier circuit (RC) that rectifies alternating current power supplied from an external power source;

a smoothing unit (C) that smoothes output power of the rectifier circuit (RC);

a main relay (10) provided on a current path between the rectifier circuit (RC) and the smoothing unit (C);

an inverter circuit (30) connected between the smoothing unit (C) and an inverter motor (M) which is a load and generating alternating current power to be supplied to the inverter motor (M); and a microcomputer (100A) that controls opening/closing operation of the main relay (10) and operation of the inverter circuit (30), wherein the microcomputer (100A) has:

a main relay opening/closing control unit (120) that outputs an opening/closing control signal which provides opening/closing direction to the main relay (10);

an inverter circuit control unit (110) outputting a drive signal to the inverter circuit (30); and a waveform forced cut-off unit (130) that receives input of an abnormality signal outputted when an abnormality detection unit (200), which detects an abnormality of the air conditioner, detects the abnormality, and electrically cuts off the inverter circuit control unit (110) when the abnormality signal is inputted, and when the main relay (10) is in a closed state and the abnormality signal has been inputted to the waveform forced cut-off unit (130), the waveform forced cut-off unit (130) electrically cuts off the inverter circuit control unit (110), and the main relay opening/closing unit (120) maintains the closed state of the main relay (10).

The power circuit according to yet another aspect of the present invention is a power circuit (3) for an air conditioner in which a refrigeration cycle is executed by circulating a refrigerant in a refrigerant circuit where a compressor, a heat-source-side heat exchanger, an expansion valve, and a utility-side heat exchanger are connected by piping, the power circuit comprising:

a rectifier circuit (RC) that rectifies alternating current power supplied from an external power source (E);

a smoothing unit (C) that smoothes output power of the rectifier circuit (RC);

a main relay (10) provided on a current path between the rectifier circuit (RC) and the smoothing unit (C);

an inverter circuit (30B) connected between the smoothing unit (C) and an inverter motor (M) which is a load and generating alternating current power to be supplied to the inverter motor (M);

a gate IC (101) that drives the inverter circuit (30B); and a microcomputer (100B) that controls opening/closing operation of the main relay (10) and operation of the gate IC (101), wherein the gate IC (101) has:

a control signal input unit (160) that receives input of a control signal outputted from the microcomputer (100B);

a drive signal output unit (170) that outputs a drive signal to the inverter circuit (30B) in response to the control signal; and a waveform forced cut-off unit (130) that receives inputs of an abnormality signal outputted when an abnormality detection unit (200), which detects an abnormality of the air conditioner, detects the abnormality, and electrically cuts off the drive signal output unit (170) when the abnormality signal is inputted, and when the main relay (10) is in a closed state and the abnormality signal has been inputted to the waveform forced cut-off unit (130), the waveform forced cut-off unit (130) electrically cuts off the drive signal output unit (170), and the microcomputer (100B) maintains the closed state of the main relay (10).

The power circuit according to yet another aspect of the present invention is A power circuit (4) for an air conditioner in which a refrigeration cycle is executed by circulating a refrigerant in a refrigerant circuit where a compressor, a heat-source-side heat exchanger, an expansion valve, and a utility-side heat exchanger are connected by piping, the power circuit comprising:

a rectifier circuit (RC) that rectifies alternating current power supplied from an external power source (E);

a smoothing unit (C) that smoothes output power of the rectifier circuit (RC);

a main relay (10) provided on a current path between the rectifier circuit (RC) and the smoothing unit (C);

an inverter circuit (30) connected between the smoothing unit (C) and an inverter motor (M) which is a load and generating alternating current power to be supplied to the inverter motor (M); and a control unit (100C) that controls opening/closing operation of the main relay and operation of the inverter circuit, wherein the control unit (100C) is provided with:

a main relay opening/closing control unit (120) that outputs a control signal which provides an opening/closing direction to the main relay (10);

an inverter circuit control unit (110) that outputs a drive signal to the inverter circuit (30); and an abnormality signal reception unit (180) that receives an abnormality signal outputted when an abnormality detection unit (500), which detects an abnormality of the air conditioner, detects the abnormality, and when the abnormality signal reception unit (180) receives the abnormality signal, the inverter circuit control unit (110) outputs a drive signal that stops the inverter circuit (30) and, after a predetermined first delay time elapses since the output, the main relay opening/closing control unit (120) outputs a control signal that sets the main relay (10) to an open state.

The computer-readable recording medium storing a control program according to yet another aspect of the present invention is a computer-readable recording medium storing a control program of a power circuit that is provided in an air conditioner in which a refrigeration cycle is executed by circulating a refrigerant in a refrigerant circuit where a compressor, a heat-source-side heat exchanger, an expansion valve, and a utility-side heat exchanger are connected by piping, and includes a rectifier circuit that rectifies alternating current power supplied from an external power source; a smoothing unit that smoothes output power of the rectifier circuit; a main relay provided on a current path between the rectifier circuit and the smoothing unit; an inverter circuit connected between the smoothing unit and an inverter motor which is a load and generating alternating current power to be supplied to the inverter motor; and a microcomputer that controls opening/closing operation of the main relay and operation of the inverter circuit, the control program causing the microcomputer to execute:

a first step of receiving an abnormality signal informing about an abnormality of the air conditioner;

a second step of stopping the inverter circuit when the abnormality signal is received; and a third step of opening the main relay after a predetermined time elapses since the execution of the second step.

BRIEF DESCRIPTION OF THE DRAWINGS

FIG. 2(A) shows the variation with time of the high-pressure abnormality signal state, FIG. 2(B) shows the variation with time of the drive signal state, FIG. 2(C) shows the variation with time of the state of waveform output of the current outputted from the power circuit, and FIG. 2(D) shows the variation with time of the opening/closing state of the electromagnetic contactor.

FIG. 4(A) shows the variation with time of the high-pressure abnormality signal state, FIG. 4(B) shows the variation with time of the drive signal state, FIG. 4(C) shows the variation with time of the state of waveform output of the current outputted from the power circuit, and FIG. 4(D) shows the variation with time of the opening/closing state of the electromagnetic contactor.

FIG. 7 is a time chart illustrating the operation of the power circuit shown in FIG. 6 when an abnormality occurs in a refrigeration cycle, FIG. 7(A) shows the variation with time of the abnormality flag state, FIG. 7(B) shows the variation with time of the state of the waveform output of electric current outputted from the power circuit, and FIG. 7(C) shows the variation with time of the opening/closing state of the electromagnetic contactor.

EMBODIMENTS FOR CARRYING OUT THE INVENTION

The power circuits according to Embodiments 1 to 4 of the present invention will explained below in detail with reference to the appended drawings.

Embodiment 1

Figure 1:
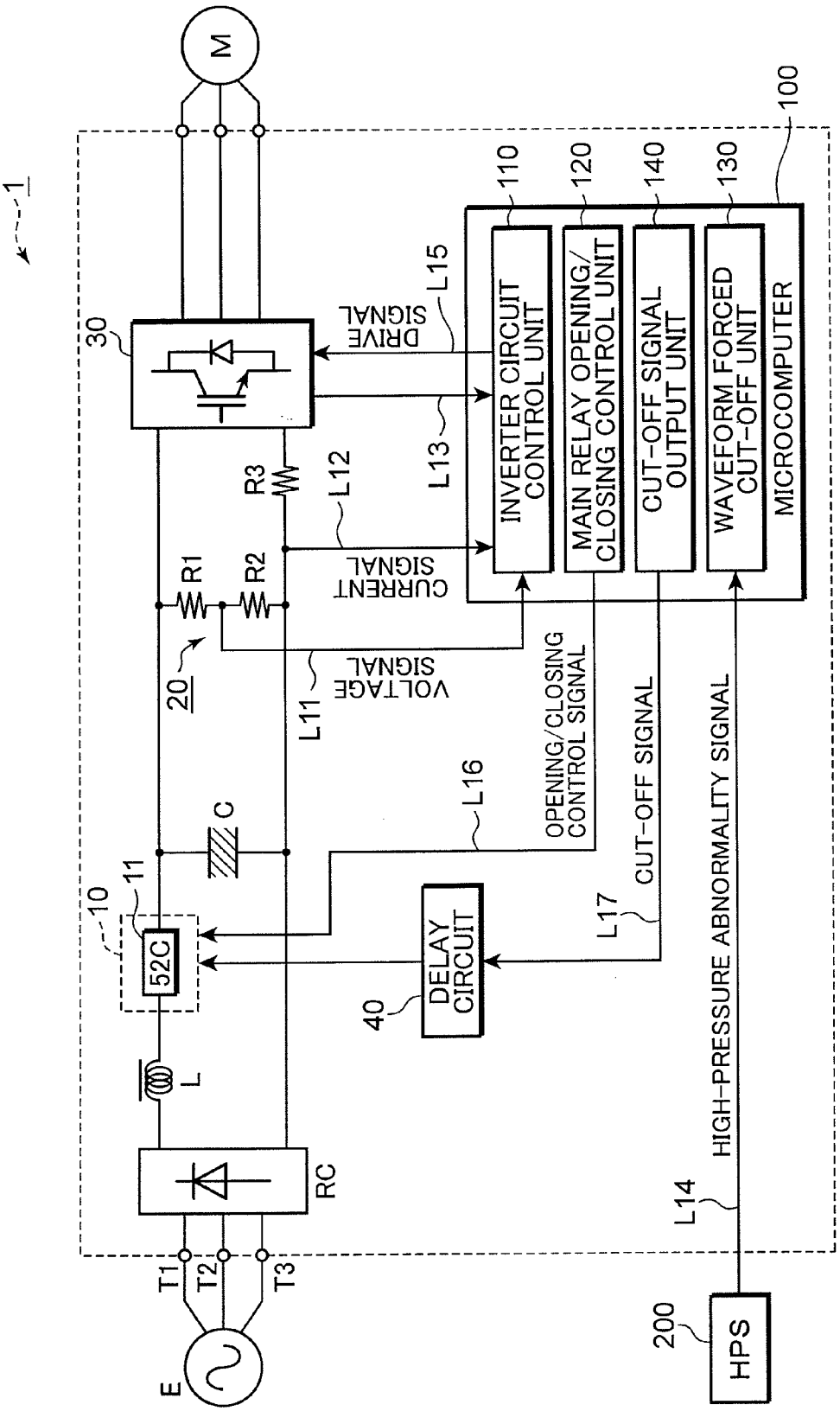
FIG. 1 is a circuit diagram illustrating the power circuit according to Embodiment 1 of the present invention.

FIG. 1 is a circuit diagram illustrating the power circuit according to Embodiment 1 of the present invention. The power circuit 1 is, for example, a power circuit driving an inverter motor M of a compressor provided in an air conditioner (not shown in the figure) and is constituted by a rectifier circuit RC, a coil L, a main relay 10, a capacitor C (smoothing unit), a voltage detection circuit 20, a shunt resistor R3, an inverter circuit 30, a delay circuit 40, and a microcomputer 100.

The rectifier circuit RC is constituted, for example, by a diode bridge circuit, connected to output terminals T1 to T3 of an external power source E which is, for example, a commercial power source, and rectifies the alternating current power outputted from the external power source E.

The coil L, main relay 10, and capacitor C are connected in series. Both terminals of this series circuit are connected to respective output terminals of the rectifier circuit RC. The capacitor C constitutes a smoothing circuit and smoothes the output of the rectifier circuit RC. The coil L is a reactor provided for improving the power factor of the inverter circuit 30.

The main relay 10 is provided with an electromagnetic contactor 11 (52C) and a thermal relay (not shown in the figure). The main relay 10, more correctly, the electromagnetic contactor 11, is provided on the current path between the rectifier circuit RC and the capacitor C and opens or closes the current path. Let us assume that the main relay 10 is provided on the alternating current power supply line on the external power source E side from the rectifier circuit RC. In such a case, the main relay 10 is necessary for each of the alternating current power supply lines of each phase connected to the external power source E and therefore the size and cost of the power circuit 1 are increased. By contrast, in the present embodiment, the main relay 10 is provided on the current path between the rectifier circuit RC and the capacitor C, that is, on the direct current side and therefore it is not necessary to provide the main relay 10 for the alternating current power supply line of each phase. As a result, the size and cost of the power circuit can be reduced.

The voltage detection circuit 20 has two voltage-dividing resistors R1 and R2 connected in series between two electrodes of the capacitor C and serves to detect a voltage between the two electrodes of the capacitor C. The connection point of the voltage-dividing resistor R1 and the voltage-dividing resistor R2 is connected by a signal line L11 to an inverter circuit control unit 110 provided in the microcomputer 100, and the voltage value in the connection point is outputted to the inverter circuit control unit 110.

The shunt resistor R3 is connected to the current path between the capacitor C and the inverter circuit 30 in order to monitor the current for driving the inverter motor M. The value of the electric current that has passed through the shunt resistor R3 is outputted via a signal line L12 to the inverter circuit control unit 110.

The inverter circuit 30 is constituted by a switching element which is, for example, an insulated gate bipolar transistor (IGBT) or a diode, converts the direct current power outputted from the capacitor C into alternating current power having a predetermined frequency, and drives the inverter motor M. The inverter circuit 30 receives the drive signal which is a PWM signal outputted from the inverter circuit control unit 110 and inputted via a signal line L15 to the inverter circuit 30, and converts the direct current power into alternating current power by on/off switching the IGBT.

The microcomputer 100 controls the operation of the air conditioner by controlling the drive of the inverter motor M, which drives the compressor, and the fan motor and also the opening degree of a plurality of motor-operated valves provided in the air conditioner. The microcomputer 100 is provided with the inverter circuit control unit 110, a main relay opening/closing control unit 120, a waveform force cut-off unit 130, and a cut-off signal output unit 140.

The inverter circuit control unit 110 is connected to the connection point of the voltage-dividing resistors R1 and R2 by the signal line L11, to the shunt resistor R3 by the signal line L12, and to the inverter circuit 30 by a signal line L13 and monitors various electric signals sent via the signal lines L11 to L13. In response to the electric signals, the inverter circuit control unit 110 outputs a drive signal that is a PWM signal to the inverter circuit 30 via a signal line L15 and controls the inverter circuit 30 so that the drive frequency of the inverter motor M assumes a predetermined value.

The main relay opening/closing control unit 120 outputs via a signal line L16 an opening/closing control signal that provides the opening/closing direction of the electromagnetic contactor 11 to the main relay 10 and opens-closes the electromagnetic contactor 11 provided on the current path between the rectifier circuit RC and the capacitor C. When the air conditioner starts operating or during the restoration after the abnormality has been eliminated, the main relay opening/closing control unit 120 closes the electromagnetic contactor 11. In this case, the aforementioned current path is in the energized state, the output from the rectifier circuit RC is supplied to the capacitor C and the inverter circuit 30, and the inverter motor M starts operating. Where the operation of the air conditioner is stopped or an abnormality is detected, the main relay opening/closing control unit 120 opens the electromagnetic contactor 11. In this case, the aforementioned current path is cut off, the output from the rectifier circuit RC is not supplied to the capacitor C and the inverter circuit 30, and the inverter motor M stops.

A high-pressure abnormality signal outputted when a high-pressure switch 200 (abnormality detection unit), which detects an abnormal increase in the high pressure of the refrigeration cycle, detects abnormal increase in the high pressure is inputted via a signal line L14 to the waveform forced cut-off unit 130. The waveform forced cut-off unit 130 is the so-called POE (Port Output Enable) and electrically cuts off the inverter circuit control unit 110 by automatically setting a drive signal output from the signal line L15 produced by the inverter circuit control unit 110 to a high impedance when the high-pressure abnormality signal is inputted.

The cut-off signal output unit 140 outputs a cut-off signal, which is a control signal that opens the electromagnetic contactor 11, via a signal line L17 to the main relay 10 when the high-pressure abnormality signal is inputted to the waveform forced cut-off unit 130.

The delay circuit 40 is a RC circuit that is provided in the signal line L17 and constituted, for example, by a resistor and a capacitor. The cut-off signal outputted by the cut-off signal output unit 140 is inputted to the delay circuit 40 and, after the predetermined time elapses since the input, the delay circuit 40 outputs the cut-off signal to the main relay 10.

Figure 2:
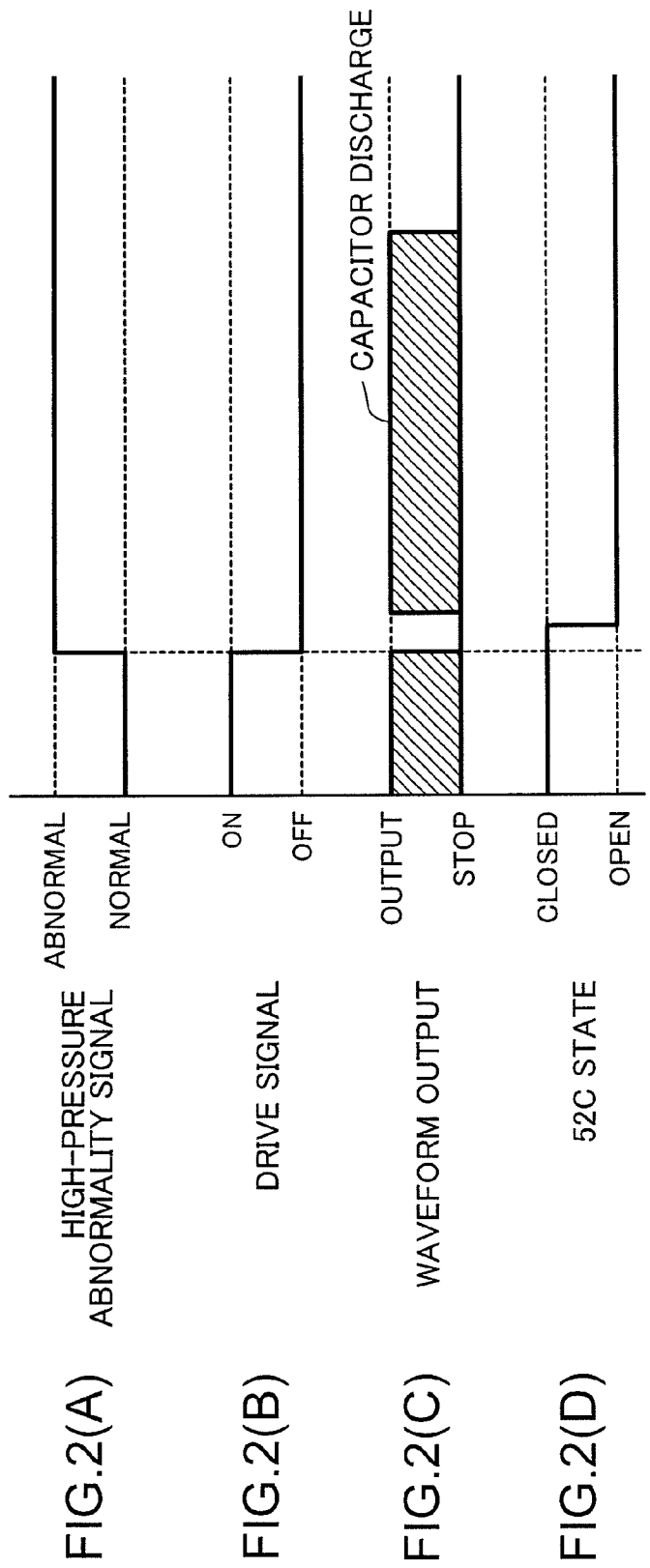
FIG. 2 is a time chart illustrating the operation of the power circuit according to Embodiment 1 of the present invention.

The operation of the power circuit 1 in the case where the electromagnetic contactor 11 is closed and the high-pressure abnormality signal is inputted to the waveform forced cut-off unit 130 will be explained below with reference to the time chart shown in FIG. 2. FIG. 2(A) shows the variation with time of the high-pressure abnormality signal state. FIG. 2(B) shows the variation with time of the drive signal state. FIG. 2(C) shows the variation with time of the state of waveform output of the current outputted from the power circuit 1. FIG. 2(D) shows the variation with time of the opening/closing state of the electromagnetic contactor 11 (52C).

Where the high-pressure abnormality signal is inputted to the waveform forced cut-off unit 130 (FIG. 2(A)) when the electromagnetic contactor 11 is in the closed state (FIG. 2(D)), the waveform forced cut-off unit 130 electrically cuts off the inverter circuit control unit 110. Therefore, the output of the drive signal from the inverter circuit control unit 110 is stopped (FIG. 2(B)). For this reason, the waveform output from the power circuit 1 stops (FIG. 2(C)), and the drive of the inverter motor M also stops. In this case, the cut-off signal output unit 140 outputs the cut-off signal to the main relay 10, but since the cut-off signal in inputted to the main relay 10 via the delay circuit 40, the electromagnetic contactor 11 is opened after the waveform output from the power circuit 1 has been stopped, that is, in a non-energized state (FIG. 2(D)). The waveform that is outputted again after the waveform output from the power circuit 1 has been stopped is produced by a capacitor discharge resulting from the output of power accumulated in the capacitor C to the inverter motor M to ensure safety (FIG. 2(C)).

When the inverter motor M is driven, a large current flows in the electromagnetic contactor 11. Therefore, when the operating inverter motor M is stopped by opening the electromagnetic contactor 11 in a power circuit in which the main relay 10 is provided on the alternating current power supply line on the external power source E side from the rectifier circuit RC, unless the electromagnetic contactor 11 is open at the zero cross point of the alternating current power supplied from the external power source E, a large load is applied to the contacts of the electromagnetic contactor 11 and the contacts of the electromagnetic contactor 11 can degrade or fuse. However, a certain time is required to detect the zero cross point. Therefore, in this configuration, it is difficult to open the electromagnetic contactor 11 instantaneously and stop the inverter motor M when the high pressure of the refrigeration cycle rises abnormally.

By contrast, in the power circuit 1, the inverter motor M is stopped by electrically cutting off the inverter circuit control unit 110 with the waveform force cut-off unit 130. Therefore, the inverter motor M can be stopped instantaneously and the refrigeration cycle can be stopped when the high pressure of the refrigeration cycle rises abnormally.

Furthermore, since the waveform force cut-off unit 130 is hardware functioning independently from the control program executed by the microcomputer 100, the inverter motor M can be stopped reliably and the refrigeration cycle can be stopped even when an abnormal increase in the high pressure occurs when an error occurs in the control program. Therefore, by using the power circuit 1 in an air conditioner, it is possible to improve safety of the air conditioner.

In addition, with the power circuit 1, the cut-off signal outputted by the cut-off signal output unit 140 upon the reception of the high-pressure abnormality signal input to the waveform force cut-off unit 130 is inputted to the main relay 10 via the delay circuit 40. Therefore, the electromagnetic contactor 11 is open after the inverter motor M has been stopped, that is, in the state in which the electromagnetic contactor 11 is not energized. Therefore, in the case where the electromagnetic contactor 11 is open when the high pressure of the refrigeration cycle rises abnormally, the contacts of the electromagnetic contactor 11 can be prevented from degradation and fusion.

Embodiment 2

Figure 3:
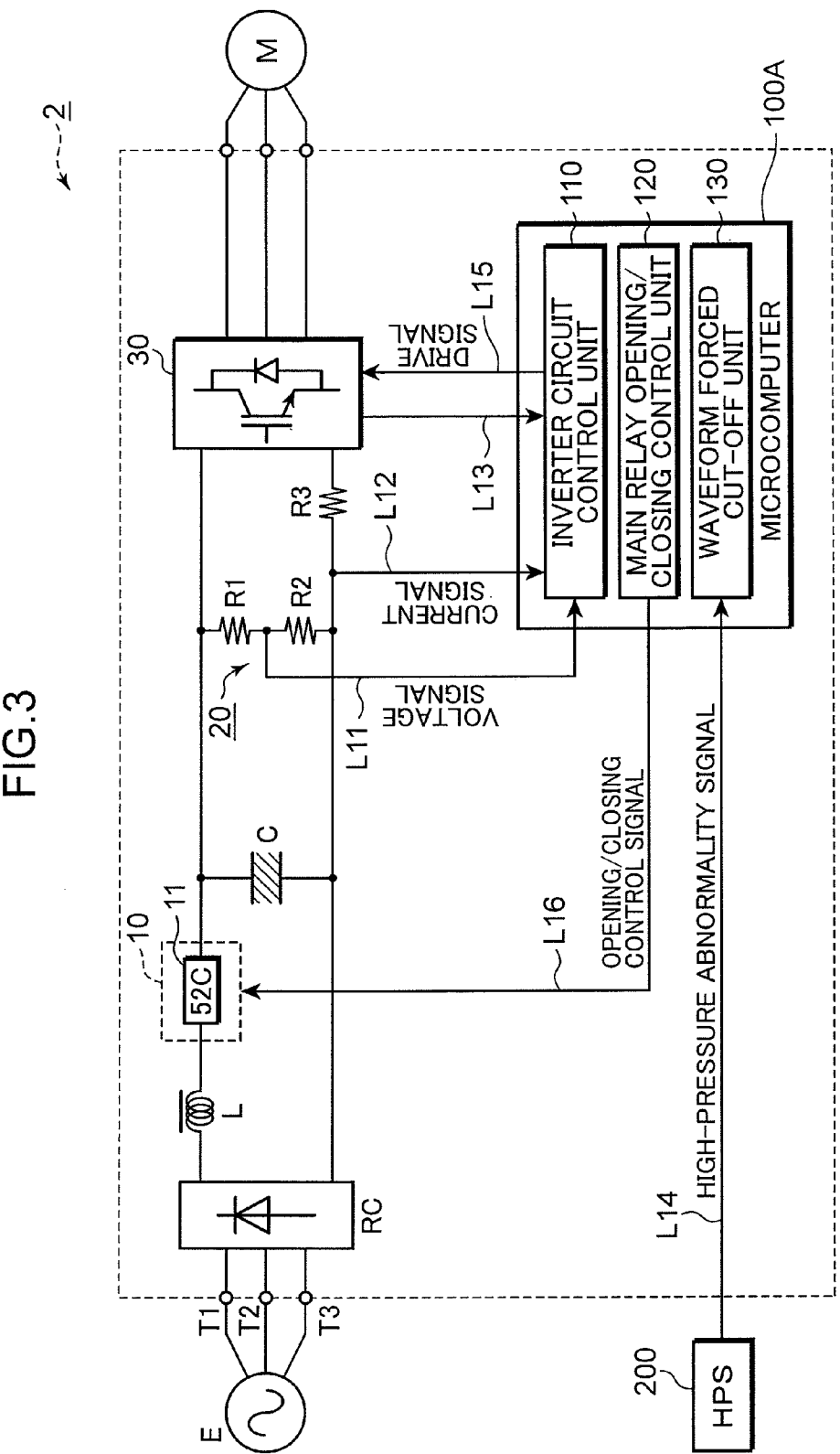
FIG. 3 is a circuit diagram illustrating the power circuit according to Embodiment 2 of the present invention.

A power circuit 2 according to Embodiment 2 of the present invention will be explained below. The features of this power circuit that are not different from those of the power circuit 1 according to Embodiment 1 will not be explained unless such an explanation is necessary. FIG. 3 is a circuit diagram illustrating the power circuit 2. Components identical to those of the power circuit 1 are assigned with same reference numerals and symbols. The configuration of the power circuit 2 is obtained by removing the cut-off signal output unit 140 and the delay circuit 40 from the configuration of the power circuit 1. Therefore, a microcomputer 100A provided in the power circuit 2 is provided with the inverter circuit control unit 110, main relay opening/closing control unit 120, and waveform forced cut-off unit 130 and configured by removing the cut-off signal output unit 140 from the microcomputer 100 provided in the power circuit 1.

Since the power circuit 2 is thus configured differently from the power circuit 1, the operation performed by the power circuit 2 when the electromagnetic contactor 11 is in the closed state and the high-pressure abnormality signal is inputted to the waveform forced cut-off unit 130 will differ from that of the power circuit 1, as will be explained below with reference to the time chart shown in FIG. 4. FIG. 4(A) shows the variation with time of the high-pressure abnormality signal state. FIG. 4(B) shows the variation with time of the drive signal state. FIG. 4(C) shows the variation with time of the state of waveform output of the current outputted from the power circuit 2. FIG. 4(D) shows the variation with time of the opening/closing state of the electromagnetic contactor 11 (52C).

Where the high-pressure abnormality signal is inputted to the waveform forced cut-off unit 130 (FIG. 4(A)) when the electromagnetic contactor 11 is in the closed state (FIG. 4(D)), the waveform forced cut-off unit 130 electrically cuts off the inverter circuit control unit 110. Therefore, the output of the drive signal from the inverter circuit control unit 110 is stopped (FIG. 4(B)). For this reason, the waveform output from the power circuit 2 stops (FIG. 4(C)). In this case, the main relay opening/closing control unit 120 maintains the closed state of the electromagnetic contactor 11, without outputting the opening/closing control signal to the main relay 10 (FIG. 4(D)). Thus, the power circuit 2 differs from the power circuit 1 in that the electromagnetic contactor 11 maintains the closed state even if the high-pressure abnormality signal is inputted to the waveform forced cut-off unit 130 when the electromagnetic contactor 11 is in the closed state.

Thus, in the power circuit 2, the main relay opening/closing control unit 120 maintains the closed state of the electromagnetic contactor 11 when the high pressure of the refrigeration cycle rises abnormally and therefore degradation and fusion of the contacts of the electromagnetic contactor 11 caused by the electromagnetic contactor 11 being open during energizing can be prevented.

Furthermore, since the electromagnetic contactor 11 is in the closed state, the fan motor of the heat exchanger (not shown in the figure) connected to the inverter motor M and the power circuit 2 can be driven. As a consequence, the efficiency of heat exchange of the refrigerant in the heat exchanger and the inside air and outside air does not decrease and therefore the restoration from the high pressure abnormality of the air conditioner can be performed faster than in the case where the electromagnetic contactor 11 is open.

Other effects of the power circuit 2 are similar to those of the power circuit 1.

Embodiment 3

Figure 5:
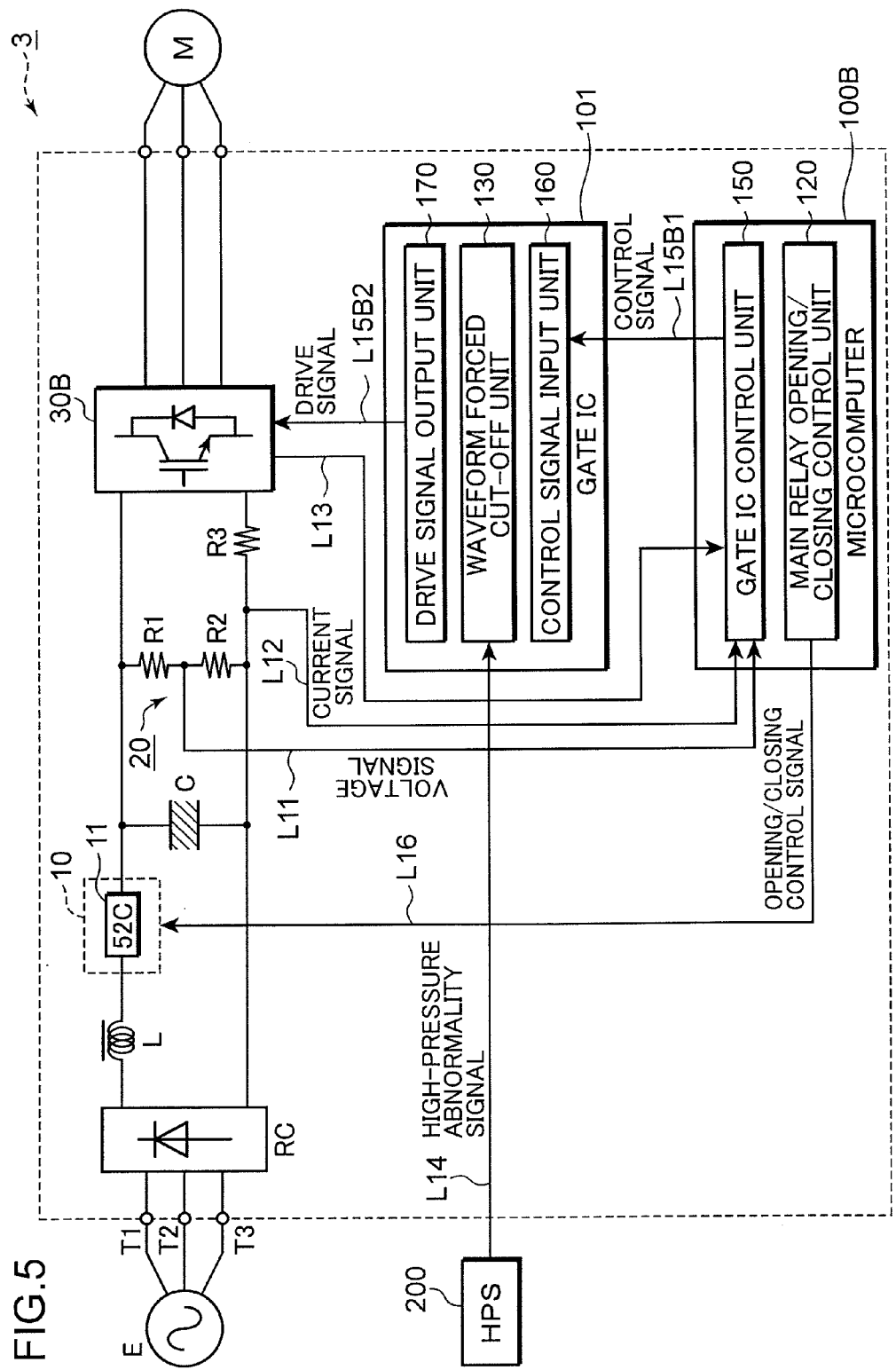
FIG. 5 is a circuit diagram illustrating the power circuit according to Embodiment 3 of the present invention.

A power circuit 3 according to Embodiment 3 of the present invention will be explained below. The features that are not different from those of Embodiments 1 and 2 will not be explained unless such an explanation is necessary. FIG. 5 is a circuit diagram illustrating the power circuit 3. Components identical to those of the power circuits 1 and 2 are assigned with same reference numerals and symbols. The configuration of the power circuit 3 differs from that of the power circuit 2 in that a gate IC 101 is necessary to drive an inverter circuit 30B and the inverter motor M is stopped by cutting off the drive signal outputted by the gate IC 101 to the inverter circuit 30B when the high pressure of the refrigeration cycle rises abnormally.

The power circuit 3 is constituted by the rectifier circuit RC, coil L, main relay 10, capacitor C (smoothing unit), voltage detection circuit 20, shunt resistor R3, inverter circuit 30B, microcomputer 100B, and gate IC 101. Mutual connection relationships for the circuits of the rectifier circuit RC, coil L, main relay 10, capacitor C, voltage detection circuit 20, shunt resistor R3, and inverter circuit 30B are the same as in the power circuits 1 and 2.

The inverter circuit 30B is constituted by an IGBT (switching element) or a diode, in the same manner as in the power circuits 1 and 2, the direct current power outputted from the capacitor C is converted into the alternating current power having a predetermined frequency, and the inverter motor M is driven by the converted power. The inverter circuit 30B receives the drive signal which is a PWM signal outputted from the drive signal output unit 170 of the gate IC 101 and inputted to the inverter circuit 30B via a signal line L15B2 and the IGBT is switched on/off, thereby converting the direct current power into the alternating current power.

The microcomputer 100B controls the operation of the air conditioner by controlling the drive of the inverter motor M, which drives the compressor, and the fan motor or the opening degree of a plurality of motor-operated valves provided in the air conditioner, in the same manner as in the power circuits 1 and 2. The microcomputer 100B is different from the microcomputer 100A of the power circuit 2 in that a gate IC control unit 150 is provided instead of the inverter circuit control unit 110, and that the waveform forced cut-off unit 130 is provided in the gate IC 101 rather than in the microcomputer 100B.

The gate IC control unit 150 is connected to the connection point of the voltage dividing resistors R1 and R2 by the signal line L11, connected to the shunt resistor R3 by the signal line L12, and connected to the inverter circuit 30 by the signal line L13 and monitors various electric signals transmitted via the signal lines L11 to L13. In response to these electric signals, the gate IC control unit 150 outputs control signals to the gate IC 101 via a signal line L15B1 and controls the gate IC 101 so that the drive frequency of the inverter motor M assumes a predetermined value.

The gate IC control unit 150 is connected to the connection point of the voltage dividing resistors R1 and R2 by the signal line L11, connected to the shunt resistor R3 by the signal line L12, and connected to the inverter circuit 30B by the signal line L13 and monitors various electric signals transmitted via the signal lines L11 to L13. In response to these electric signals, the gate IC control unit 150 outputs control signals to the gate IC 101 via a signal line L15B1 and controls the gate IC 101 so that the drive frequency of the inverter motor M assumes a predetermined value.

The gate IC 101 is provided with a control signal input unit 160, a drive signal output unit 170, and a waveform forced cut-off unit 130. The control signal outputted by the gate IC control unit 150 is inputted to the control signal input unit 160 via a signal line L15B1. The drive signal output unit 170 generates as a drive signal a PWM signal corresponding to the control signal inputted to the control signal input unit 160 and outputs the drive signal to the inverter circuit 30B via a signal line L15B2.

Figure 4:
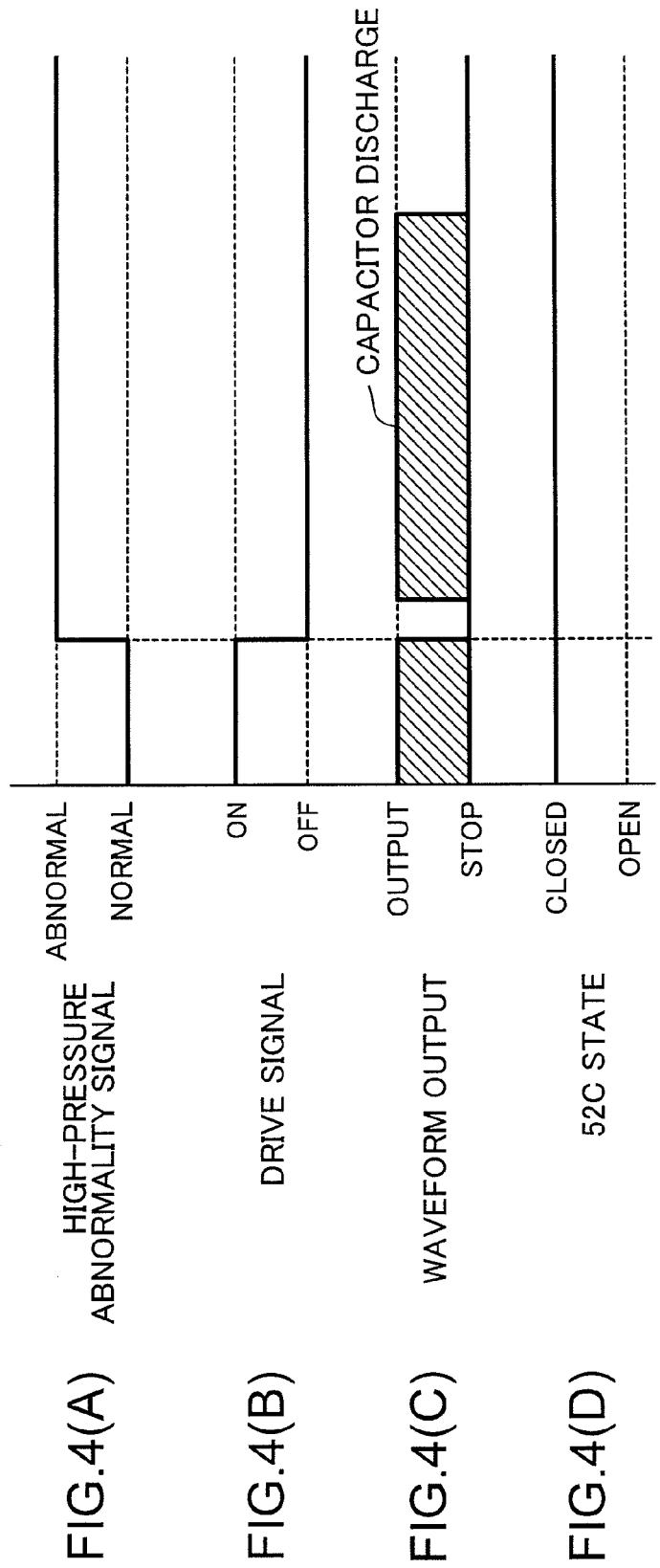
FIG. 4 is a time chart illustrating the operation of the power circuit according to Embodiment 2 of the present invention.

The variations with time of the state of the high-pressure abnormality signal, the state of the drive signal, the state of the waveform output of the current outputted from the power circuit 3, and the opening/closing state of the electromagnetic contactor 11 in the power circuit 3 when the electromagnetic contactor 11 is closed and the high-pressure abnormality signal has been inputted to the waveform force cut-off unit 130 are similar to those obtained for the power circuit 2 and shown in the time chart in FIG. 4.

The effects obtained by using the power circuit 3 in the air conditioner are similar to those obtained in Embodiment 2.

The power circuits 1 to 3 according to Embodiments 1 to 3 of the present invention are explained above, but the present invention is not limited thereto and, for example, the following modified embodiments can be also used.

(1) In the power circuit 3 according to Embodiment 3, the inverter circuit 30B that requires the gate IC 101 as a drive circuit is used as the inverter circuit, but the so-called intelligent power module that is provided with functions of a gate IC having the control signal input unit 160, drive signal output unit 170, and waveform forced cut-off unit 130 can be used as an inverter circuit instead of the inverter circuit 30B. By using the intelligent power module, it is possible to miniaturize the power circuit and reduce cost by decreasing the number of components.

(2) In Embodiments 1 to 3, only one main relay 10 is provided in the power circuit, but in the case of a high-capacity power circuit, a plurality of main relays may be provided in parallel. As a result, it is not necessary to use a main relay designed for a high capacity and therefore the main relay is easier to procure and the cost can be reduced.

Embodiment 4 and Others

Figure 6:
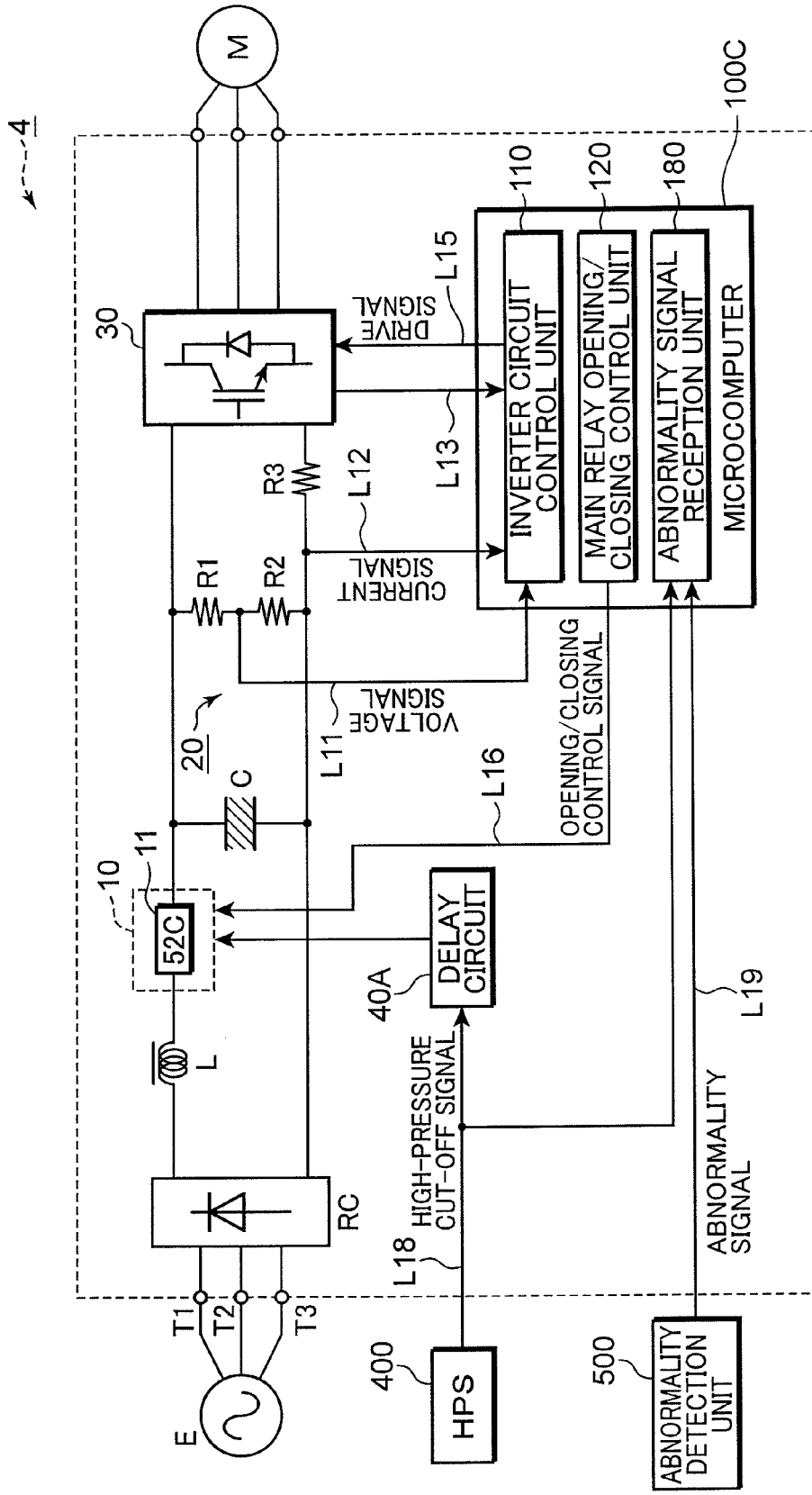
FIG. 6 is a circuit diagram illustrating the power circuit according to Embodiment 4 of the present invention.

A power circuit 4 according to Embodiment 4 of the present invention and a control program for the power circuit 4 will be explained below. The power circuit 4 according to Embodiment 4 of the present invention and the control program for the power circuit 4 will be explained in detail with reference to the appended drawings. FIG. 6 shows a circuit diagram illustrating the power circuit 4. The features that are not particularly explained in the description of the power circuit 4 are not different from respective features of Embodiments 1 to 3 and are shared therewith. Therefore, these features will not be explained, unless such an explanation is necessary.

The power circuit 4 is a power source device that drives the inverter motor M of a compressor provided, for example, in an air conditioner (not shown in the figure), and this power circuit is constituted by the rectifier circuit RC, coil L, main relay 10, capacitor C (smoothing unit), voltage detection circuit 20, shunt resistor R3, inverter circuit 30, a delay circuit 40A, and a microcomputer 100C (control unit).

The voltage detection circuit 20 has two voltage-dividing resistors R1 and R2 connected in series between two electrodes of the capacitor C and serves to detect a voltage between the two electrodes of the capacitor C. The connection point of the voltage-dividing resistor R1 and the voltage-dividing resistor R2 is connected by a signal line L11 to the inverter circuit control unit 110 provided in the microcomputer 100C, and the voltage value in the connection point is outputted to the inverter circuit control unit 110.

The shunt resistor R3 is connected to the current path between the capacitor C and the inverter circuit 30 in order to monitor the current for driving the inverter motor M. The value of the electric current that has passed through the shunt resistor R3 is outputted via a signal line L12 to the inverter circuit control unit 110.

The inverter circuit 30 receives the drive signal which is a PWM signal outputted from the inverter circuit control unit 110 and inputted via a signal line L15 to the inverter circuit 30, and converts the direct current power into alternating current power by on/off switching the IGBT.

The microcomputer 100C controls the operation of the air conditioner by controlling the drive of the inverter motor M, which drives the compressor, and the fan motor and also the opening degree of a plurality of motor-operated valves provided in the air conditioner. The microcomputer 100C is provided with the inverter circuit control unit 110, the main relay opening/closing control unit 120, and an abnormality signal reception unit 180.

The inverter circuit control unit 110 is connected to the connection point of the voltage-dividing resistors R1 and R2 by the signal line L11, to the shunt resistor R3 by the signal line L12, and to the inverter circuit 30 by a signal line L13 and monitors various electric signals sent via the signal lines L11 to L13. On the basis of these electric signals, the inverter circuit control unit 110 outputs a drive signal that is a PWM signal to the inverter circuit 30 via the signal line L15 and controls the inverter circuit 30 so that the drive frequency of the inverter motor M assumes a predetermined value.

The abnormality signal reception unit 180 receives via a signal line L19 an abnormality signal outputted when the abnormality detection unit 50, which detects abnormalities of the refrigeration cycle, has detected an abnormality. When the abnormality signal is received, the abnormality signal reception unit 180 outputs an abnormality flag, the inverter circuit control unit 110 uses the abnormality flag as a trigger and outputs a drive signal that stops the inverter circuit 30, and the main relay opening/closing control unit 120 uses the abnormality flag as a trigger and outputs a control signal that sets the electromagnetic contactor 11 of the main relay 10 to the open state after a predetermined first delay time, for example 10 ms, elapses since the output.

A high-pressure cut-off signal that is outputted when the high-pressure switch 400, which detects an abnormal rise in the high pressure of the refrigeration cycle, detects the abnormal rise in the high pressure and that sets the electromagnetic contactor 11 to the open state is also inputted to the main relay 10 via the signal line L18. In addition, the signal line L18 is branched and also connected to the abnormality signal reception unit 180, and the high-pressure cut-off signal is also inputted to the abnormality signal reception unit 180. The abnormality signal reception unit 180 that has received the high-pressure cut-off signal processes the high-pressure cut-off signal as the abnormality signal and outputs an abnormality flag.

The delay circuit 40A is, for example, an RC circuit constituted by a resistor and a capacitor that is provided in the signal line L18 connected to the main relay 10. The high-pressure cut-off signal outputted by the high-pressure switch 400 to the main relay 10 is first inputted to the delay circuit 40A, and the delay circuit 40A outputs the high-pressure cut-off signal to the main relay 10 after a second delay time, which is longer than the predetermined first delay time, elapses since the input.

Therefore, since the electromagnetic contact 11 is opened after the second delay time, the inverter motor M can be stopped reliably, thereby stopping the refrigeration cycle, even when an abnormal rise in the high pressure has occurred at the time of error occurrence in the control program of the microcomputer 100C and the electromagnetic contact 11 of the main relay 100 has not been opened after the first delay time. Therefore, safety of the air conditioner can be increased.

The operation of the power circuit 4 at the time an abnormality occurs in the refrigeration cycle will be explained below with reference to the time chart shown in FIG. 7. FIG. 7(A) shows the variation with time of the abnormality flag state. FIG. 7(B) shows the variation with time of the state of the waveform output of electric current outputted from the power circuit. FIG. 7(C) shows the variation with time of the opening/closing state of the electromagnetic contactor.

Where an abnormality occurs in the refrigeration cycle and the abnormality signal outputted by the abnormality detection unit 500 is inputted to the abnormality signal reception unit 180, the abnormality signal reception unit 180 performs abnormality verification by which the abnormality signal is distinguished from noise and then outputs an abnormality flag (FIG. 7(A)). The inverter circuit control unit 110 uses the abnormality flag as a trigger and outputs a drive signal that stops the inverter circuit 30. Therefore, the waveform output from the power circuit 4 is stopped (FIG. 7(B)) and the drive of the inverter motor M is also stopped. The main relay opening/closing control unit 120 also uses the abnormality flag as a trigger and outputs a control signal that sets the electromagnetic contactor 11 of the main relay 10 to the open state after the first delay time of 10 ms elapses since the output. Therefore, the electromagnetic contactor 11 is open after the waveform output from the power circuit 4 has been stopped, that is, in the non-energized state (FIG. 7(C)). The waveform that is outputted again after the waveform output from the power circuit 4 has been stopped is produced by a capacitor discharge resulting from the output of power accumulated in the capacitor C to the inverter motor M to ensure safety (FIG. 7(B)).

When the inverter motor M is driven, a large current flows in the electromagnetic contactor 11. Therefore, when the main relay 10 is provided on the alternating current power supply line on the external power source E side from the rectifier circuit RC and the operating inverter motor M is stopped by opening the electromagnetic contactor 11, unless the electromagnetic contactor 11 is open at the zero cross point of the alternating current power supplied from the external power source E, a large load is applied to the contacts of the electromagnetic contactor 11 and the contacts of the electromagnetic contactor 11 can degrade or fuse. However, a certain time is required to detect the zero cross point. Therefore, in this configuration, it is difficult to open the electromagnetic contactor 11 instantaneously and stop the inverter motor M when the high pressure of the refrigeration cycle rises abnormally.

By contrast, in the power circuit 4, the inverter motor M is stopped when the inverter circuit control unit 110 outputs a drive signal that stops the inverter circuit 30. Therefore, the inverter motor M can be stopped instantaneously and the refrigeration cycle can be stopped when the high pressure of the refrigeration cycle rises abnormally.

According to the above-described embodiment, when an abnormality occurs in the refrigeration cycle, that is, when the abnormality signal unit 180 receives the abnormality signal, the inverter circuit control unit 110 outputs a drive signal that stops the inverter circuit 30, and the main relay opening/closing control unit 120 outputs a control signal that sets the electromagnetic contactor 11 of the main relay 10 to the open state after the predetermined first delay time (in the percent embodiment, 10 ms) elapses since the output. Therefore, the electromagnetic contactor 11 is opened after the inverter motor M has been stopped, that is, in a state in which the electromagnetic contactor 11 is not energized. Therefore, the contacts of the electromagnetic contactor 11 can be prevented from degradation and fusion when the electromagnetic contactor 11 is opened at the time an abnormality occurs in the refrigeration cycle. Furthermore, the first delay time can be set shorter than the zero cross point determination time, for example, to 10 ms as in the above-described embodiment.

Further, with the above-described embodiment, since the inverter motor M that drives the compressor is stopped when an abnormality occurs in the refrigeration cycle, the refrigeration cycle in which the abnormality has occurred can be stopped and the air conditioner can be protected.

The power circuit 4 according to one embodiment of the present invention is described above, but the present invention is not limited thereto and, for example, the following modified embodiments can be used.

In Embodiment 4, the contacts of the electromagnetic contactor 11 are prevented from degrading and fusing by stopping the inverter motor M when an abnormality occurs in the refrigeration cycle and opening the electromagnetic contactor 11 after the electromagnetic contactor 11 has been set to the non-energized state. Instead, the contacts of the electromagnetic contactor 11 can be also prevented from degradation and fusion occurring when the electromagnetic contactor 11 is opened in the energized state even when the inverter motor M is stopped when an abnormality occurs in the refrigeration cycle, in the same manner as in the above-described embodiment, but the main relay opening/closing unit 120 does not output the control signal that sets the electromagnetic contactor 11 of the main relay 10 to the open state and the electromagnetic contactor 11 is maintained in the closed state when an abnormality occurs in the refrigeration cycle. The advantage of such a configuration is that the fan motor of the heat exchanger (not shown in the figure) connected to the power circuit 4 can be driven together with the inverter motor M of the compressor.

In Embodiment 4, a plurality of main relays 10 may be also provided in parallel in the case of a high-capacity power circuit. As a result, it is not necessary to use a main relay for high-capacity application and therefore the main relay is easier to procure and the cost can be reduced.

Essentially, the present invention provides a power circuit for an air conditioner in which a refrigeration cycle is executed by circulating a refrigerant in a refrigerant circuit where a compressor, a heat-source-side heat exchanger, an expansion valve, and a utility-side heat exchanger are connected by piping, the power circuit including: a rectifier circuit that rectifies alternating current power supplied from an external power source; a smoothing unit that smoothes output power of the rectifier circuit; a main relay provided on a current path between the rectifier circuit and the smoothing unit; an inverter circuit connected between the smoothing unit and an inverter motor which is a load and generating alternating current power to be supplied to the inverter motor; a microcomputer having a main relay opening/closing control unit that outputs an opening/closing control signal which provides opening/closing direction to the main relay, an inverter circuit control unit outputting a drive signal to the inverter circuit, a waveform forced cut-off unit that receives input of an abnormality signal outputted when an abnormality detection unit, which detects an abnormality of the air conditioner, detects the abnormality, and electrically cuts off the inverter circuit control unit when the abnormality signal is inputted, and a cut-off signal output unit that outputs a cut-off signal that is a control signal setting the main relay to an open state to the main relay when the abnormality signal is inputted to the waveform forced cut-off unit, and moreover the microcomputer controlling opening/closing operation of the main relay and operation of the inverter circuit; and a delay circuit that receives input of the cut-off signal and outputs the cut-off signal to the main relay after a predetermined time elapses since the input, wherein when the main relay is in a closed state and the abnormality signal has been inputted to the waveform forced cut-off unit, the waveform forced cut-off unit electrically cuts off the inverter circuit control unit, the cut-off signal outputted from the cut-off signal output unit is inputted to the main relay via the delay circuit, and the main relay is set to an open state by the input of the cut-off signal.

With such a configuration, the main relay is provided on the direct current path between the rectifier circuit and the smoothing unit and opens/closes the electric current path. Therefore, by contrast with the case in which the main relay is provided on the alternating power source line on the external power source side from the rectifier circuit and the main relay is necessary for each of the alternating power source lines of each phase connected to the external power source, it is not necessary to provide the main relay for each of the alternating power source lines of each phase and therefore the power circuit can be reduced in size and cost.

Furthermore, with the above-described configuration, in the case where the main relay is in the closed state at the time an abnormality occurs in the refrigeration cycle and when the abnormality signal is inputted to the waveform forced cut-off unit, the waveform forced cut-off unit stops the inverter motor by electrically cutting off the inverter circuit control unit. Therefore, the inverter motor can be reliably stopped when an abnormality occurs in the refrigeration cycle. Furthermore, the cut-off signal outputted from the cut-off signal output unit upon the reception of the abnormality signal input to the waveform forced cut-off unit is inputted to the main relay via the delay circuit. Therefore, the main relay is opened after the inverter motor has been stopped, that is, in a state in which the main relay is not energized. For this reason, the contacts of the main relay can be prevented from degradation and fusion when the main relay is opened at the time an abnormality occurs in the refrigeration cycle.

In accordance with the present invention, it is further preferred that in the above-described configuration, the inverter motor to which the inverter circuit is connected be the inverter motor that drives the compressor.

With such a configuration, the compressor is stopped when an abnormality occurs in the refrigeration cycle. Therefore, the refrigeration cycle in which the abnormality has occurred can be stopped.

In accordance with the present invention, in the above-described configuration, the abnormality detection unit may be a high-pressure switch that detects an abnormal rise in the high pressure of the refrigeration cycle, and the abnormality signal may be a high-pressure abnormality signal outputted by the high-pressure switch when the high pressure of the refrigeration cycle rises abnormally.

With such a configuration, the compressor is stopped to stop reliably the refrigeration circuit when the high pressure of the refrigeration cycle rises abnormally. Therefore, safety of the air conditioner can be improved.

The present invention also provides a power circuit for an air conditioner in which a refrigeration cycle is executed by circulating a refrigerant in a refrigerant circuit where a compressor, a heat-source-side heat exchanger, an expansion valve, and a utility-side heat exchanger are connected by piping, the power circuit including: a rectifier circuit that rectifies alternating current power supplied from an external power source; a smoothing unit that smoothes output power of the rectifier circuit; a main relay provided on a current path between the rectifier circuit and the smoothing unit; an inverter circuit connected between the smoothing unit and an inverter motor which is a load and generating alternating current power to be supplied to the inverter motor; and a microcomputer that controls opening/closing operation of the main relay and operation of the inverter circuit, wherein the microcomputer has: a main relay opening/closing control unit that outputs an opening/closing control signal which provides opening/closing direction to the main relay; an inverter circuit control unit outputting a drive signal to the inverter circuit; and a waveform forced cut-off unit that receives input of an abnormality signal outputted when an abnormality detection unit, which detects an abnormality of the air conditioner, detects the abnormality, and electrically cuts off the inverter circuit control unit when the abnormality signal is inputted, and when the main relay is in a closed state and the abnormality signal has been inputted to the waveform forced cut-off unit, the waveform forced cut-off unit electrically cuts off the inverter circuit control unit, and the main relay opening/closing unit maintains the closed state of the main relay.

With such a configuration, the main relay is provided on the direct current path between the rectifier circuit and the smoothing unit and opens/closes the electric current path. Therefore, by contrast with the case in which the main relay is provided on the alternating power source line on the external power source side from the rectifier circuit and the main relay is necessary for each of the alternating power source lines of each phase connected to the external power source, it is not necessary to provide the main relay for each of the alternating power source lines of each phase and therefore the power circuit can be reduced in size and cost.

Furthermore, with the above-described configuration, in the case where the main relay is in the closed state at the time an abnormality occurs in the refrigeration cycle and when the abnormality signal is inputted to the waveform forced cut-off unit, the waveform forced cut-off unit stops the inverter motor by electrically cutting off the inverter circuit control unit. Therefore, the inverter motor can be reliably stopped when an abnormality occurs in the refrigeration cycle. Furthermore, since the main relay opening/closing control unit maintains the closed state of the main relay, the contacts of the main relay can be prevented from degradation and fusion occurring when the main relay is opened during energizing.

The present invention also provides a power circuit for an air conditioner in which a refrigeration cycle is executed by circulating a refrigerant in a refrigerant circuit where a compressor, a heat-source-side heat exchanger, an expansion valve, and a utility-side heat exchanger are connected by piping, the power circuit comprising: a rectifier circuit that rectifies alternating current power supplied from an external power source; a smoothing unit that smoothes output power of the rectifier circuit; a main relay provided on a current path between the rectifier circuit and the smoothing unit; an inverter circuit connected between the smoothing unit and an inverter motor which is a load and generating alternating current power to be supplied to the inverter motor; a gate IC that drives the inverter circuit; and a microcomputer that controls opening/closing operation of the main relay and operation of the gate IC, wherein the gate IC has: a control signal input unit that receives input of a control signal outputted from the microcomputer; a drive signal output unit that outputs a drive signal to the inverter circuit in response to the control signal; and a waveform forced cut-off unit that receives input of an abnormality signal outputted when an abnormality detection unit, which detects an abnormality of the air conditioner, detects the abnormality, and electrically cuts off the drive signal output unit when the abnormality signal is inputted, and when the main relay is in a closed state and the abnormality signal has been inputted to the waveform forced cut-off unit, the waveform forced cut-off unit electrically cuts off the drive signal output unit, and the microcomputer maintains the closed state of the main relay.

With such a configuration, the main relay is provided on the direct current path between the rectifier circuit and the smoothing unit and opens/closes the electric current path. Therefore, by contrast with the case in which the main relay is provided on the alternating power source line on the external power source side from the rectifier circuit and the main relay is necessary for each of the alternating power source lines of each phase connected to the external power source, it is not necessary to provide the main relay for each of the alternating power source lines of each phase and therefore the power circuit can be reduced in size and cost.

Furthermore, with the above-described configuration, in the case where the main relay is in the closed state at the time an abnormality occurs in the refrigeration cycle and when the abnormality signal is inputted to the waveform forced cut-off unit, the waveform forced cut-off unit stops the inverter motor by electrically cutting off the drive signal output unit. Therefore, the inverter motor can be reliably stopped when an abnormality occurs in the refrigeration cycle. Furthermore, since the microcomputer maintains the closed state of the main relay, the contacts of the main relay can be prevented from degradation and fusion occurring when the main relay is opened during energizing.

In accordance with the present invention, in the above-described configuration, the inverter circuit may be an intelligent power module provided with functions of the gate IC having a control signal input unit into which a control signal outputted from the microcomputer is inputted, a drive signal output unit that outputs a drive signal to an inverter in response to the control signal, and a waveform forced cut-off unit that receives input of an abnormality signal outputted when an abnormality detection unit, which detects an abnormality of the air conditioner, detects the abnormality, and electrically cuts off the drive signal output unit when the abnormality signal is inputted.

With such a configuration, since the gate IC is provided integrally with the inverter circuit, the power circuit can be miniaturized and the cost can reduced due to the decrease in the number of components.

The present invention also provides a power circuit for an air conditioner in which a refrigeration cycle is executed by circulating a refrigerant in a refrigerant circuit where a compressor, a heat-source-side heat exchanger, an expansion valve, and a utility-side heat exchanger are connected by piping, the power circuit comprising: a rectifier circuit that rectifies alternating current power supplied from an external power source; a smoothing unit that smoothes output power of the rectifier circuit; a main relay provided on a current path between the rectifier circuit and the smoothing unit; an inverter circuit connected between the smoothing unit and an inverter motor which is a load and generating alternating current power to be supplied to the inverter motor; and a control unit that controls opening/closing operation of the main relay and operation of the inverter circuit, wherein the control unit is provided with: a main relay opening/closing control unit that outputs a control signal which provides an opening/closing direction to the main relay; an inverter circuit control unit that outputs a drive signal to the inverter circuit; and an abnormality signal reception unit that receives an abnormality signal outputted when an abnormality detection unit, which detects an abnormality of the air conditioner, detects the abnormality, and when the abnormality signal reception unit receives the abnormality signal, the inverter circuit control unit outputs a drive signal that stops the inverter circuit and, after a predetermined first delay time elapses since the output, the main relay opening/closing control unit outputs a control signal that sets the main relay to an open state.

With such a configuration, the main relay is provided on the direct current path between the rectifier circuit and the smoothing unit and opens/closes the electric current path. Therefore, by contrast with the case in which the main relay is provided on the alternating power source line on the external power source side from the rectifier circuit and the main relay is necessary for each of the alternating power source lines of each phase connected to the external power source, it is not necessary to provide the main relay for each of the alternating power source lines of each phase and therefore the power circuit can be reduced in size and cost.

Furthermore, with the above-described configuration, when the abnormality signal reception unit receives an abnormality signal, the inverter circuit control unit outputs a drive signal that stops the inverter circuit, and the main relay opening/closing control unit outputs a control signal that closes the main relay after the predetermined first delay time since the output. Therefore, the main relay is opened after the inverter motor has been stopped, that is, in the state in which the main relay is not energized. As a result, the contacts of the main relay can be prevented from degradation and fusion occurring when the main relay is opened at the time an abnormality occurs in the refrigeration cycle.

In accordance with the present invention, in the above-described configuration, the inverter motor to which the inverter circuit is connected may be the inverter motor that drives the compressor.

With the above-described configuration, since the compressor is stopped when an abnormality occurs in the refrigeration cycle, the refrigeration cycle in which the abnormality has occurred can be stopped.

Further, according to the present invention in the above-described configuration, the abnormality signal reception unit may further receive as the abnormality signal a high-pressure cut-off signal that is outputted by a high-pressure switch, when the high pressure of the refrigeration cycle rises abnormally, and that sets the main relay to the open state; a delay circuit may be further provided that receives input of the high-pressure cut-off signal and outputs the high-pressure cut-off signal to the main relay after a predetermined second delay time elapses since the input, the second delay time being longer than the first delay time; and the high-pressure cut-off signal is inputted to the main relay via the delay circuit.

With such a configuration, the compressor can be reliably stopped to stop the refrigeration cycle when the high pressure of the refrigeration cycle rises abnormally. Therefore, safety of the air conditioner can be increased.

The present invention also provides a computer-readable recording medium storing a control program of a power circuit that is provided in an air conditioner in which a refrigeration cycle is executed by circulating a refrigerant in a refrigerant circuit where a compressor, a heat-source-side heat exchanger, an expansion valve, and a utility-side heat exchanger are connected by piping, and includes a rectifier circuit that rectifies alternating current power supplied from an external power source; a smoothing unit that smoothes output power of the rectifier circuit; a main relay provided on a current path between the rectifier circuit and the smoothing unit; an inverter circuit connected between the smoothing unit and an inverter motor which is a load and generating alternating current power to be supplied to the inverter motor; and a microcomputer that controls opening/closing operation of the main relay and operation of the inverter circuit, the control program causing the microcomputer to execute: a first step of receiving an abnormality signal informing about an abnormality of the air conditioner; a second step of stopping the inverter circuit when the abnormality signal is received; and a third step of opening the main relay after a predetermined time elapses since the execution of the second step.

The invention claimed is:

1. A power circuit for an air conditioner in which a refrigeration cycle is executed by circulating a refrigerant in a refrigerant circuit where a compressor, a heat-source-side heat exchanger, an expansion valve, and a utility-side heat exchanger are connected by piping,
   the power circuit comprising:
   a rectifier circuit that rectifies alternating current power supplied from an external power source;
   a smoothing unit that smoothes output power of the rectifier circuit;
   a main relay provided on a current path between the rectifier circuit and the smoothing unit;
   an inverter circuit connected between the smoothing unit and an inverter motor which is a load and generating alternating current power to be supplied to the inverter motor;
   a microcomputer having a main relay opening/closing control unit that outputs an opening/closing control signal which provides opening/closing direction to the main relay, an inverter circuit control unit outputting a drive signal to the inverter circuit, a waveform forced cut-off unit that is hardware that receives input of an abnormality signal outputted when an abnormality detection unit, which detects an abnormality of the air conditioner, detects the abnormality, and that automatically sets the drive signal output to a high impedance to thereby electrically cut off the inverter circuit control unit when the abnormality signal is inputted, and a cut-off signal output unit that, separately from the main relay opening/closing control unit, outputs a cut-off signal that is a control signal setting the main relay to an open state to the main relay when the abnormality signal is inputted to the waveform forced cut-off unit, and moreover the microcomputer controlling opening/closing operation of the main relay and operation of the inverter circuit; and a delay circuit that is provided on a line connecting the cut-off signal output unit and the main relay and that receives input of the cut-off signal and outputs the cut-off signal to the main relay after a predetermined time elapses since the input, wherein when the main relay is in a closed state and the abnormality signal has been inputted to the waveform forced cut-off unit, the waveform forced cut-off unit electrically cuts off the inverter circuit control unit, the cut-off signal outputted from the cut-off signal output unit is inputted to the main relay via the delay circuit, and the main relay is set to the open state by the input of the cut-off signal.

2. The power circuit according to claim 1, wherein the inverter motor to which the inverter circuit is connected is the inverter motor that drives the compressor.

3. The power circuit according to claim 2, wherein
the abnormality detection unit is a high-pressure switch that detects an abnormal rise in the high pressure of the refrigeration cycle; and
the abnormality signal is a high-pressure abnormality signal outputted by the high-pressure switch when the high pressure of the refrigeration cycle rises abnormally.

4. A power circuit for an air conditioner in which a refrigeration cycle is executed by circulating a refrigerant in a refrigerant circuit where a compressor, a heat-source-side heat exchanger, an expansion valve, and a utility-side heat exchanger are connected by piping,
the power circuit comprising:
a rectifier circuit that rectifies alternating current power supplied from an external power source;
a smoothing unit that smoothes output power of the rectifier circuit;
a main relay provided on a current path between the rectifier circuit and the smoothing unit;
an inverter circuit connected between the smoothing unit and an inverter motor which is a load and generating alternating current power to be supplied to the inverter motor; and
a control unit that controls opening/closing operation of the main relay and operation of the inverter circuit, wherein
the control unit is provided with:
a main relay opening/closing control unit that outputs a control signal which provides an opening/closing direction to the main relay;
an inverter circuit control unit that outputs a drive signal to the inverter circuit; and
an abnormality signal reception unit that receives a high-pressure cut-off signal that is outputted by a high-pressure switch when a high-pressure of the refrigeration cycle rises abnormally and that sets the main relay to an open state, and
the power circuit further comprises a delay circuit that receives the high-pressure cut-off signal outputted from the high-pressure switch, and outputs the high-pressure cut-off signal to the main relay after delaying the high-pressure cut-off signal for a predetermined time,
when the abnormality signal reception unit receives the high-pressure cut-off signal, the inverter circuit control unit outputs a drive signal that stops the inverter circuit and, after a predetermined first delay time elapses since the output, the main relay opening/closing control unit outputs a control signal that sets the main relay to the open state, and
when the high-pressure cut-off signal is inputted, the delay circuit outputs the high-pressure cut-off signal to the main relay after a second delay time as the predetermined time elapses since the input, the second delay time being longer than the first delay time.

5. The power circuit according to claim 4, wherein the inverter motor to which the inverter circuit is connected is the inverter motor that drives the compressor.

* * * * *